(12) United States Patent
Sorochkin et al.

(10) Patent No.: US 7,100,546 B2
(45) Date of Patent: Sep. 5, 2006

(54) CRANKSHAFTLESS INTERNAL COMBUSTION ENGINE

(76) Inventors: Mark Sorochkin, POB 16557, Nazaret Illit (IL); Eleonora Sorochkin, POB 16557, Nazaret Illit (IL); Alexey Sorochkin, Yonge Street 3600, AP, 531, Toronto (CA)

( * ) Notice: Subject to any disclaimer, the term of this patent is extended or adjusted under 35 U.S.C. 154(b) by 0 days.

(21) Appl. No.: 10/944,837

(22) Filed: Sep. 21, 2004

(65) Prior Publication Data

US 2006/0059907 A1 Mar. 23, 2006

(51) Int. Cl.
*F02B 71/00* (2006.01)
*F02B 25/08* (2006.01)
*B60K 6/04* (2006.01)
*F02B 71/04* (2006.01)
*F02B 75/04* (2006.01)
*F02B 75/28* (2006.01)
*F02B 75/22* (2006.01)

(52) U.S. Cl. .................. 123/46 R; 123/51 B; 123/55.5; 60/597

(58) Field of Classification Search .................. 60/595, 60/325, 597; 123/55.2, 55.5, 55.7, 51 B, 123/46 R, 46 A, 46 E, 46 SC; 91/506; 92/147
See application file for complete search history.

(56) References Cited

U.S. PATENT DOCUMENTS

| | | | | |
|---|---|---|---|---|
| 1,816,406 A * | 7/1931 | Spencer | ...................... | 123/55.5 |
| 1,950,970 A * | 3/1934 | Chilton | ...................... | 123/51 B |
| 2,080,846 A * | 5/1937 | Alfaro | ...................... | 123/51 B |
| 2,182,213 A * | 12/1939 | Redrup | ...................... | 123/51 B |
| 2,290,936 A * | 7/1942 | Bakewell | .................... | 123/55.5 |
| 2,914,909 A * | 12/1959 | Kubik | ......................... | 60/595 |
| 2,982,087 A * | 5/1961 | Foster | ......................... | 60/597 |
| 3,146,765 A * | 9/1964 | Bush | ........................ | 123/46 R |
| 3,932,989 A * | 1/1976 | Demetrescu | ............. | 123/46 R |
| 4,112,683 A * | 9/1978 | Bess | ........................ | 123/46 R |
| 4,966,000 A | 10/1990 | Wolters | ....................... | 60/595 |
| 5,799,628 A * | 9/1998 | Lacerda | ..................... | 123/55.5 |
| 6,293,231 B1 * | 9/2001 | Valentin | .................... | 123/46 R |
| 6,318,309 B1 * | 11/2001 | Burrahm et al. | ........... | 123/51 B |
| 2005/0284428 A1 * | 12/2005 | Tusinean et al. | .......... | 123/46 R |
| 2006/0042575 A1 * | 3/2006 | Schmuecker et al. | ..... | 123/46 R |

FOREIGN PATENT DOCUMENTS

DE    101 24 056    11/2002

* cited by examiner

*Primary Examiner*—Thai-Ba Trieu
(74) *Attorney, Agent, or Firm*—Mark M. Friedman

(57) ABSTRACT

The engine of the present invention provides the direct transfer of energy from the burning down of fuel in the engine cylinders into shaft power by forcing working liquid through guide devices and against an impulse turbine, thereby eliminating the need for supplemental pumps and the usual power losses associated therewith, thus improving the fuel consumption to power output ratio. In addition the engine of the present invention provides an internal combustion engine characterized by a crankshaftless design which meets all of the requirements for operation over the speed ranges necessary for a wide range of the propulsion systems, such as but not limited to, cars, and trucks of all sizes, rail traction, and marine propulsion.

21 Claims, 6 Drawing Sheets

CRANKSHAFTLESS INTERNAL COMBUSTION ENGINE

FIELD AND BACKGROUND OF THE INVENTION

The present invention relates to reciprocating internal combustion engines and, in particular, it concerns a compound engine composed of crankshaftless internal combustion units associated with an impulse turbine unit.

It has long been recognized in internal combustion engines that by increasing the compression ratio the thermodynamic efficiency of the combustion process rises. That is, from the thermodynamic point of view, higher specific output from internal combustion engines is possible through higher working pressure involving higher delivering temperatures. In the pursuit of higher power engines, excess load on the crankshaft, connecting rods, and the support bearing, and excessive supplementary torsional vibration, which cause crankshaft trouble, have became severe problems. Another drawback in the standard reciprocating internal combustion engines is an increased noise level produced by impacts of the pistons in a lateral direction against the walls of each cylinder due to transverse forces caused by the inclination of the connecting rods.

Several types of crankshaftless internal combustion engines have been suggested, most notable being the Wankel rotary engines. However, due to problems associated with the complexity of sealing of the combustion chamber and work space with the rotating rings, none of these engines resulted in a reliable, long life version.

Other suggestion of crankshaftless internal combustion engines include those disclosed in DE10124056 to Sperling, and U.S. Pat. No. 4,966,000 to Wolters. In both of these engines the fluid chamber is located between two pistons coupled to each other by a common rod, thus the working fluid is located close to combustion chamber. This will inevitably result in some working fluid getting past the piston rings and entering into the combustion chamber. Alternatively, gases from combustion chamber may blow by the piston rings and contaminate the working liquid, which may be overheated and irreversibly damaged.

In the Sperling device, there are no bladed guide devices at the input of the turbine. Working fluid from the fluid chamber is forced to the turbine through passages, which results in significant power losses.

There is therefore a need for a compound engine composed of a crankshaftless internal combustion units associated with an impulse turbine unit in which combustion chambers are separated from the fluid pumping mechanism and that the energy of the burning down fuel in the engine cylinders is transferred substantially directly to the hydraulic working liquid.

SUMMARY OF THE INVENTION

The present invention is a compound engine composed of a crankshaftless internal combustion units associated with an impulse turbine unit.

According to the teachings of the present invention there is provided, an internal combustion engine comprising: (a) at least one hydraulic cylinder assembly containing therein a working liquid, the at least one hydraulic cylinder assembly configured so as to be displaceable in a substantially reciprocating movement; (b) at least one impulse turbine deployed within the hydraulic cylinder, the impulse turbine mechanically linked to a rotatable output shaft, the impulse turbine configured such that movement of the working liquid during the reciprocating movement of the hydraulic cylinder assembly effects axial rotation of the impulse turbine; (c) at least a first and second pistons mechanically linked to the hydraulic cylinder assembly; and (d) at least a first and second cylinders configured to slidingly receive the at least a first and second pistons such that movement of each of the pistons is effected within the first and second cylinders by combustion of fuel in combustion chambers defined by the at least a first and second pistons and the at least a first and second cylinders; wherein movement of the pistons affects the reciprocating movement of the at least one hydraulic cylinder.

According to a further teaching of the present invention, the hydraulic cylinder assembly is slidebly received on cylinder guides.

According to a further teaching of the present invention, the hydraulic cylinder guide includes at least two bladed guide devices formed by stationary guide buckets attached to the cylinder guides and facing the impulse turbine in an opposing and concentric orientation, such that the working liquid is forced through the bladed guide devices and against the impulse turbine.

According to a further teaching of the present invention, the impulse turbine is positioned between the at least two guide devices.

According to a further teaching of the present invention, the hydraulic cylinder assembly and the cylinder guides define a substantially annular space permanently filled with working liquid.

According to a further teaching of the present invention, the impulse turbine is mounted on the cylinder guides.

According to a further teaching of the present invention, the at least a first piston is configured with a direction of stroke extending substantially parallel to an axis of the impulse turbine, and the at least a second piston is configured with a direction of stroke extending substantially perpendicular to the axis of the impulse turbine.

According to a further teaching of the present invention, the at least a first piston is mechanically linked to the hydraulic cylinder assembly using connecting rods attached to a bracket substantially rigidly affixed to the hydraulic cylinder assembly and the at least a second piston is mechanically linked to the hydraulic cylinder assembly using connecting rods attached to at least one rotatable linking rod that is in turn rotatably attached to a support substantially rigidly affixed to the hydraulic cylinder assembly.

According to a further teaching of the present invention, as one of the at least a first and the at least a second pistons is experiencing an expansion stroke another of the at least a first and the at least a second pistons is experiencing a compression stroke, such that force of the expansion stroke of one of the at least a first and the at least a second pistons provides force for the compression stroke of another of the at least a first and the at least a second pistons.

According to a further teaching of the present invention, an inclination of the connecting rods is substantially unchanged throughout a course of the compression and the expansion strokes, therefore substantially no lateral forces are applied to wall of the cylinders by the pistons.

According to a further teaching of the present invention, an expansion stroke of one of the at least a first and the at least a second pistons causes movement in a first direction of the reciprocating movement of the at least one hydraulic cylinder assembly and an expansion stroke of another of the at least a first and the at least a second pistons causes movement in a second direction of the reciprocating movement of the at least one hydraulic cylinder.

According to a further teaching of the present invention, the at least a first piston is implemented as a plurality of the first pistons configured with the direction of stroke extending substantially parallel to an axis of the impulse turbine, and the at least a second piston is implemented as a plurality of the second pistons configured with the direction of stroke extending substantially perpendicular to the axis of the impulse turbine.

According to a further teaching of the present invention, a substantially similar working process occurs substantially simultaneously in each one of the engine block assemblies housing opposing pistons.

According to a further teaching of the present invention, the at least one hydraulic cylinder assembly and at least one impulse turbine are implemented as a first and second the hydraulic cylinder assemblies and a first and second impulse turbines, such that one of the first and second impulse turbines is deployed in each of the first and second hydraulic cylinder assemblies.

According to a further teaching of the present invention, a first half of the plurality of the first pistons is mechanically linked to the first hydraulic cylinder assembly, a second half of the plurality of the first pistons is mechanically linked to the second hydraulic cylinder assembly, a first half of the plurality of the second pistons is mechanically linked to the first hydraulic cylinder assembly, and a second half of the plurality of the second pistons is mechanically linked to the second hydraulic cylinder assembly.

According to a further teaching of the present invention, the hydraulic cylinder assembly is deployed in a rigid case.

According to a further teaching of the present invention, the cylinder guides are attached to the rigid case.

According to a further teaching of the present invention, each of the at least a first and second pistons are deployed in an engine block assembly, each the engine block assembly being modularly attached to the rigid case.

According to a further teaching of the present invention, each the engine block assembly houses one the cylinder configured to slidingly receive one the piston.

According to a further teaching of the present invention, each the engine block assembly includes inlet and outlet valves, the inlet and outlet valves being actuated by an externally mounted mechanical timing assembly.

According to a further teaching of the present invention, the mechanical timing assembly includes a crank mechanism activated by the reciprocating movement of the at least one hydraulic cylinder.

According to a further teaching of the present invention, the timing assembly provides the two hydraulic cylinder assemblies running synchronously.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
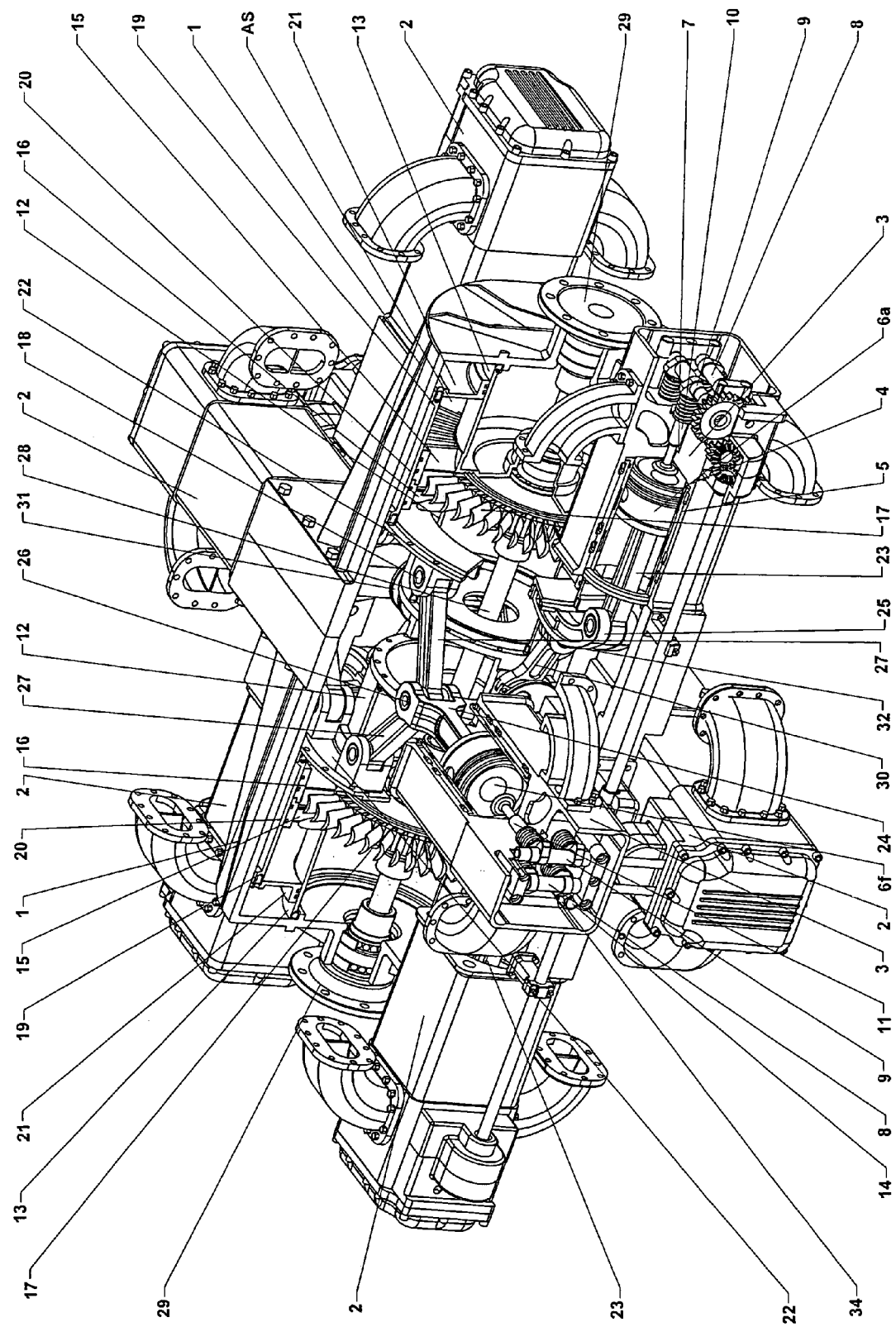
FIG. 1 is a perspective cutaway view of a compound internal combustion engine constructed and operative according to the teachings of the present invention.

The present invention is a compound engine composed of a crankshaftless internal combustion units associated with an impulse turbine unit.

The principles and operation of a compound engine composed of a crankshaftless internal combustion units associated with an impulse turbine unit according to the present invention may be better understood with reference to the drawings and the accompanying description.

By way of introduction, the engine of the present invention has an inherent efficiency due to high combustion pressure. Further, a high level of reliability is achieved due to elimination of the engine crankshaft, lateral thrust of the pistons on the cylinder wall, and elimination of supplementary devices to deliver working liquid to an impulse turbine of a power turbine unit. As used herein, the phrase impulse turbine refers to a turbine that is driven by force applied directly against the blades of the turbine when working liquid passes through the blades.

As known in routine hydraulic transmission units being now in wide spread use, the working liquid acquires kinetic energy by means of a centrifugal pump (impeller in the case of fluid couple for instance) driven by the engine crankshaft to transmit energy to a hydraulic turbine (turbine's wheel). This chain of supplementary devices results in the loss of energy during fluid transfer between devices. This results in a high fuel consumption to power output ratio. The engine of the present invention provides the direct transmission the energy from the combustion of gases to the output shaft by passing the working liquid through guide buckets and impulse turbine blades, thereby eliminating the need for hydraulic centrifugal pump, thus improving the fuel consumption to power output ratio.

In addition the engine of the present invention provides an internal combustion engine having a configuration relatively simpler than conventional engines that meets all requirements to operate over the speed ranges necessary for a wide range of the propulsion systems, such as but not limited to, cars, vans and trucks of all sizes, rail traction, and marine propulsion. This internal combustion engine is very compact and well suited for use in automobiles, which require an engine having torque performance that meets the needs of different road conditions.

The internal combustion engine according to present invention is characterized by a crankshaftless design and substantially direct transmission the energy from the burning down fuel in the engine cylinders, that is, the combustion of fuel gases, to the working liquid. Energy is transmitted to the working liquid by the substantially reciprocating movement of a hydraulic cylinder assembly which is directly coupled to the engine pistons by connecting rods. It will be appreciated that while the hydraulic cylinder assembly is directly coupled to the engine pistons by connecting rods the combustion chambers are spatially separated from the hydraulic cylinder assembly.

The hydraulic cylinder assembly and the associated substantially cylindrical cylinder guide, which has a diameter that is less than the diameter of the hydraulic cylinder, define between them a substantially annular space permanently filled with working liquid. The hydraulic cylinder assembly travels back and forth on the cylinder guide in a substantially reciprocating movement adapted to supply the working liquid to the turbine blades through stationary guide devices mounted on the cylinder guide inside the hydraulic cylinder assembly. The stationary guide devices suitably configured and positioned on both sides of the turbine. Energy is extracted from the working liquid as it passes through the blades of an impulse turbine, which is coupled to the output shaft. While the preferred embodiment described herein relates to two turbines with one turbine deployed in each of the two hydraulic cylinder assemblies, this is not intended as a limitation, and embodiments with more than one turbine deployed within a hydraulic cylinder assembly is within the scope of the present invention.

A first preferred embodiment of the engine of the present invention is configured with eight engine block assemblies, each including one piston, two hydraulic cylinder assemblies and two turbines, one deployed in each of the hydraulic cylinder assemblies. Four of the pistons have a direction of stroke extending substantially parallel to the axis of the output shaft and turbines, and four of the pistons have a direction of stroke extending substantially perpendicular to the axis of the output shaft and turbines.

In alternative embodiments of the engine, the number of engine block assemblies may be altered by four. That is, there may be embodiments having four engine block assemblies, eight engine block assemblies, twelve engine block assemblies, and so on. However, a minimal embodiment having as few as two pistons, one hydraulic cylinder assembly and one turbine is within the scope of the present invention.

The pistons are connected to the hydraulic cylinder assemblies by connecting rods having substantially no inclination which results in the elimination of lateral forces acting on the cylinder wall and side surface of the pistons. That is, the inclination of the connecting rods remains substantially unchanged throughout the course of compression and expansion strokes. Due to the direction of movement of half of the pistons in one direction and the movement of the other half of the pistons in opposite direction and the movement of the two hydraulic cylinder assemblies in opposite directions, the inertial forces developed by the reciprocating masses of the pistons, rods and hydraulic cylinder assemblies cancel each other. The unique and effective way in which inertial forces are counterbalanced in this design eliminates the need for balancing, thereby minimizing overall weight and providing an inherently low vibration engine.

Such an arrangement of the pistons results in transferring the force from the pistons experiencing an expansion stroke so as to provide compression of fuel mixture in the cylinders in which fuel has been injected and in which the pistons are experiencing a compression stroke.

The inlet and outlet valves are driven in a conventional manner by external camshafts. The camshafts are driven by a mechanism coupled to the hydraulic cylinders and having toothed gear train ratio 1:2, in the case of a four cycle engine.

Referring now to the drawings, the compound internal combustion engine according to one embodiment of the present invention will be described in detail.

Figure 3:
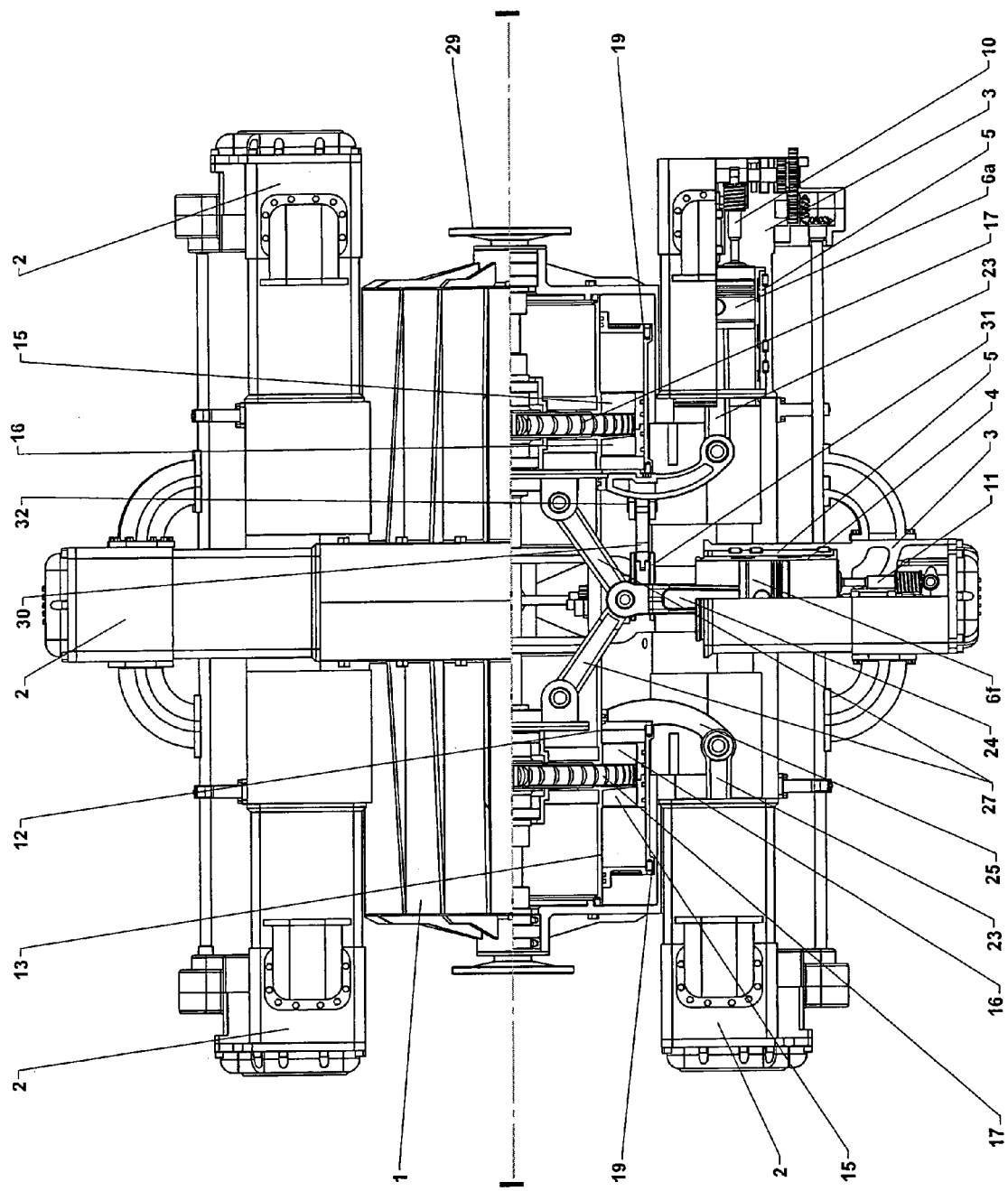
FIG. 3 is top view of the engine of FIG. 1.
Figure 4:
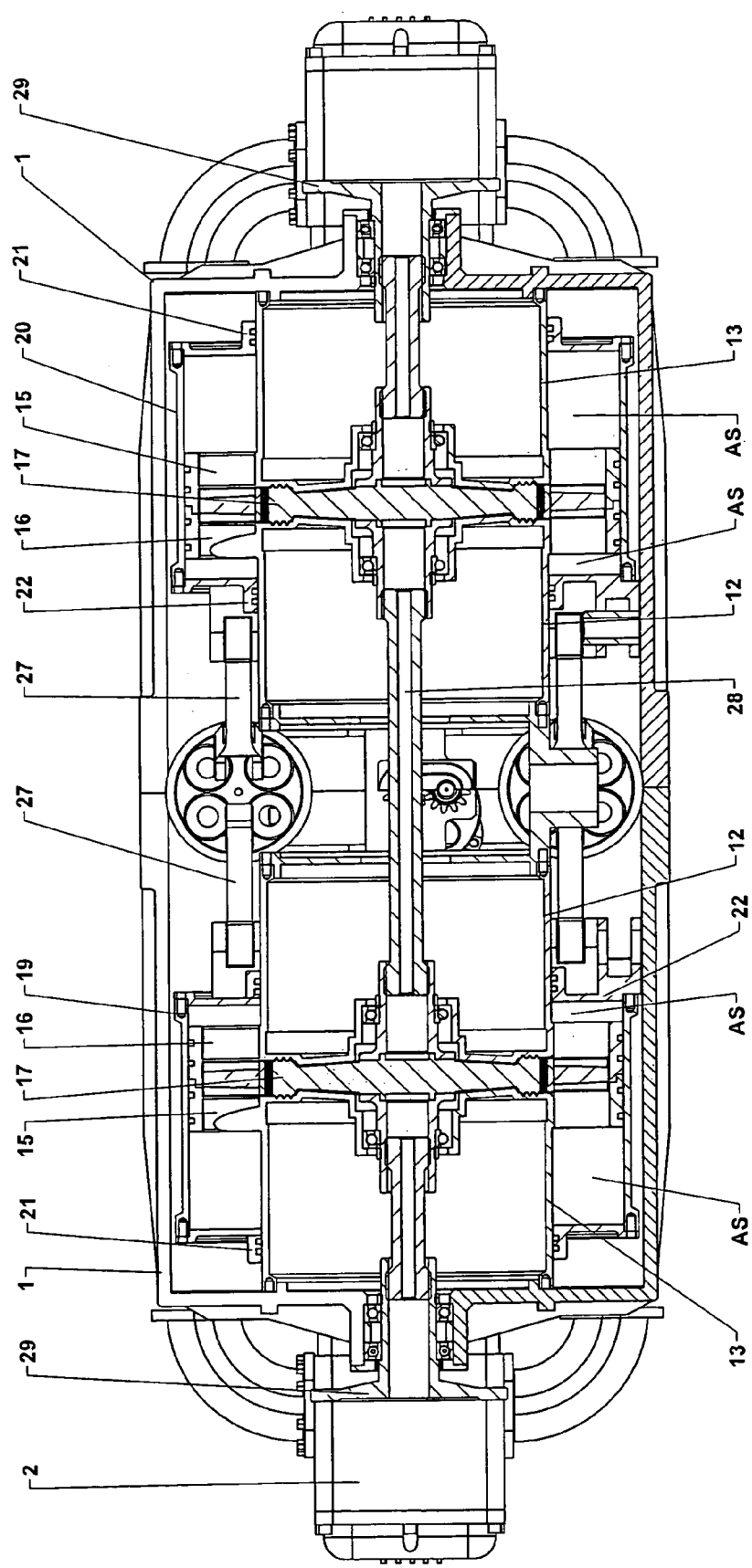
FIG. 4 is a sectional view of the engine of FIG. 1 taken along line I—I in FIG. 3.

The compound internal combustion engine supplies output connection flanges 29 at either end of a rigid case assembly, which is generally referred to in FIGS. 1, 3 and 4 as 1. The rigid case 1, consisting of two parts, serves as the main structural support member of the engine and provides, in a modular fashion, mounting locations for the engine block assemblies 2 and a housing for the hydraulic power unit. The engine block assemblies 2 are attached to the engine case 1 by studs 14 and nuts 34. The modular design of the engine allows for easy service and modular replacement each of the various sections such as, but not limited to, the engine block assemblies. As illustrated in FIG. 1, each of the engine block assemblies 2 includes a monoblock 3, and a cylinder sleeve 4 and sleeve shirt 5, which together form the engine cylinder. Piston 6 is slidebly received in the cylinder sleeve 4. It should be noted that embodiments in which one engine block assembly houses more than one engine cylinder and piston are within the scope of the present invention.

Intake 8 and exhaust 9 camshafts that are rotatably supported at the upper part of the monoblock 3 actuate the inlet 10 and outlet 11 valves respectively. A fuel injector 7 is positioned between the inlet 10 and outlet 11 valves.

Figure 2:
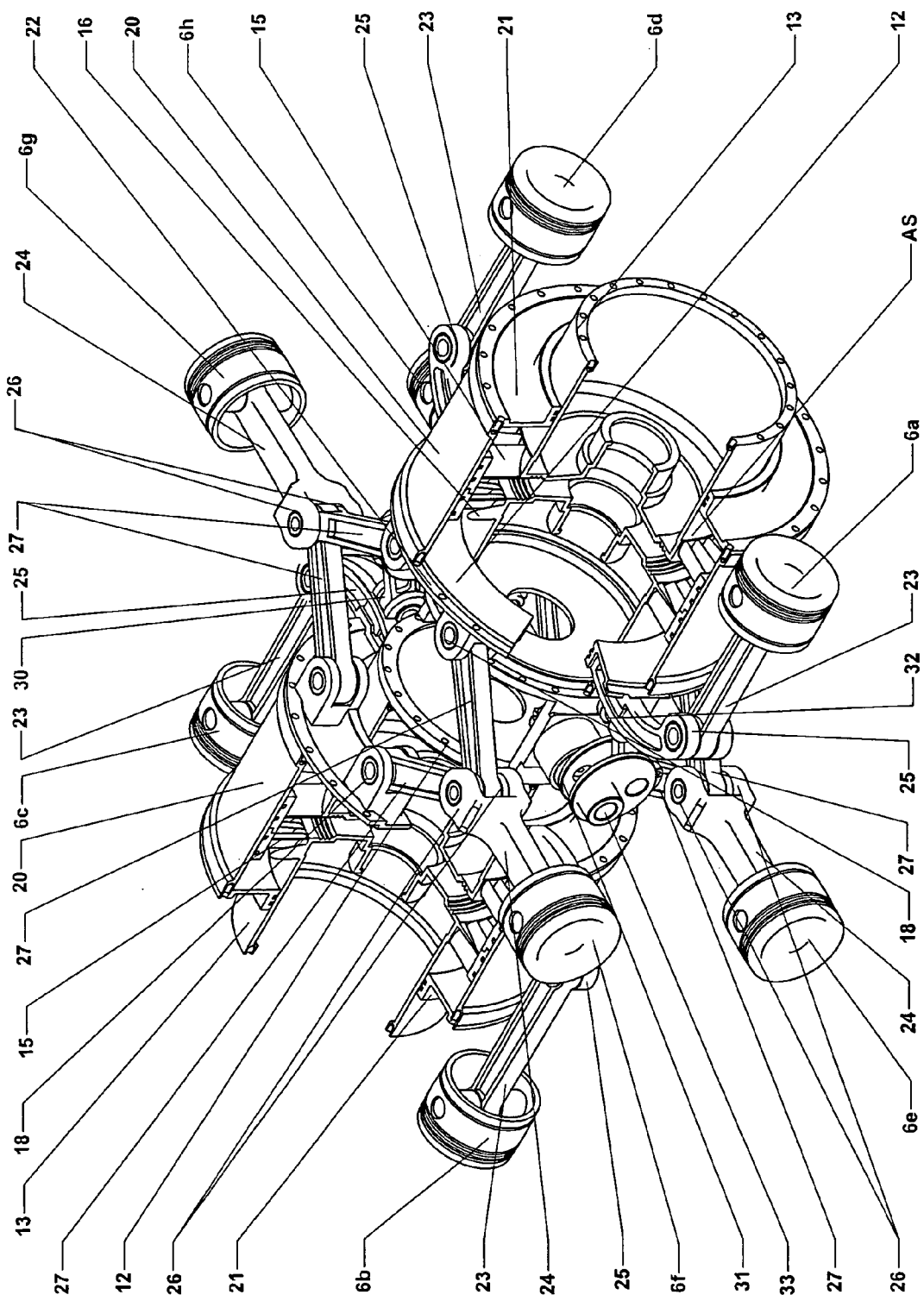
FIG. 2 is a perspective view showing reciprocating mechanism of the engine of FIG. 1.

As shown in FIG. 2, the internal components of the engine are supported by the interconnected hydraulic cylinder guides 12 and 13 that are also attached to the rigid engine case 1. Each of the hydraulic cylinder guides 12 and 13 includes bladed guide devices 15 and 16 formed by stationary guide buckets attached to the cylinder guides 12 and 13 and facing the impulse turbine 17 in an opposing and concentric orientation.

Each impulse turbine 17 is positioned between guide devices 15 and 16 adjacent to the stationary guide device buckets facing them. The impulse turbines 17 are coupled to one another by shaft 28. The impulse turbines 17 are also coupled to output shafts that terminate in the output connection flanges 29.

The two hydraulic cylinder assemblies 19 are slidebly received on the cylinder guides 12 and 13. Each of the hydraulic cylinder assemblies 19 includes a cylinder 20 and a pair of supports 21 and 22. The hydraulic cylinder 20, supports 21 and 22 and hydraulic cylinder guides 12 and 13 form between them an annular space AS permanently filled with working liquid.

The two different types of the connecting rods are indicated by numerals 23 and 24 respectively. Each of connecting rods 23 are attached to one of pistons 6a, 6b, 6c, and 6d at the proximal end and are rotatably attached at the distal end to bracket 25 that is fixedly attached to hydraulic cylinder assembly 20. Therefore, each of the pistons 6 whose longitudinal axes is substantially parallel to the axis of rotation of the impulse turbines 17 are coupled to only one of the hydraulic cylinder assemblies 19. Each of the connecting rods 24 are attached to one of pistons 6e, 6f, 6g, and 6h at the proximal end and configured with a pair of journals 26 at the distal end. The journals 26 are positioned symmetrically relative to the longitudinal axis of the connecting rod 24. Rotatably attached to each of the journals 26 in connecting rods 24 are linking rods 27 each of which is rotatably attached at its opposite end to a support 22 on the hydraulic cylinder assembly 19 by pivot 18. Therefore, each of the pistons 6 whose longitudinal axis is substantially perpendicular to the axis of rotation of the impulse turbines 17 are coupled to both of the hydraulic cylinder assemblies 19. In such a configuration, as each one of pistons 6e, 6f, 6g, and 6h experiences an expansion stroke, the connecting rods 24 move toward a central longitudinal vertical plane of the engine case 1, causing linking rods 27 to push the two supports 22 and therefore the two hydraulic cylinder assemblies 19 away from each other. That is to say, the forces of connecting rods 24 that are substantially perpendicular to the direction of the reciprocating movements of the two hydraulic cylinder assemblies 19 away are converted into forces that are substantially parallel to the direction of the reciprocating movements of the two hydraulic cylinder assemblies 19 by linking rods 27.

As shown in FIG. 2 the longitudinal axes of connecting rods 23 and 24 are substantially perpendicular each other such that the longitudinal axes of connecting rods 23 are substantially parallel to the axis of the impulse turbines 17 and the longitudinal axes of connecting rods 24 are substantially perpendicular to the axis of the impulse turbines 17.

As illustrated best in FIG. 2, half of the pistons 6 attached to like connecting rods move in opposition to the other half of the pistons 6 attached to the same style of connecting rods. That is, pistons 6a and 6d move in a direction opposite to pistons 6b and 6c. Similarly, pistons 6e and 6f move in a direction opposite to pistons 6g and 6h. In this way, piston pairs 6a and 6b, and 6c and 6d move synchronously either toward each other (expansion stroke) or away from each other (compression stroke). Similarly, piston pairs 6e and 6h, and 6f and 6g also move synchronously either toward each other (expansion stroke) or away from each other (compression stroke). In order to achieve the desired reciprocating movement of the two hydraulic cylinder assemblies 19, the stroke of the pistons is such that when piston pairs 6a and 6b, and 6c and 6d are moving toward each other(expansion stroke) piston pairs 6e and 6h, and 6f and 6g are moving away from each other (compression stroke), and vise versa. That is to say, a similar working process, such as expansion or compression, occurs substantially simultaneously in each one of the engine block assemblies housing opposing pistons. Such piston movement causes the two hydraulic cylinder assemblies 19, to move reciprocatingly either toward or away from each other in a synchronized fashion on the cylinder guides 12 and 13. The working liquid located in the annular space AS between hydraulic cylinder assemblies 19 and guides 12 and 13 is pushed through guide devices 15 and 16 onto the impulse turbine 17, thereby generating rotation of the impulse turbine 17. As shown in the FIG. 4, the impulse turbines 17 are directly coupled to output shaft 29.

Figure 6:
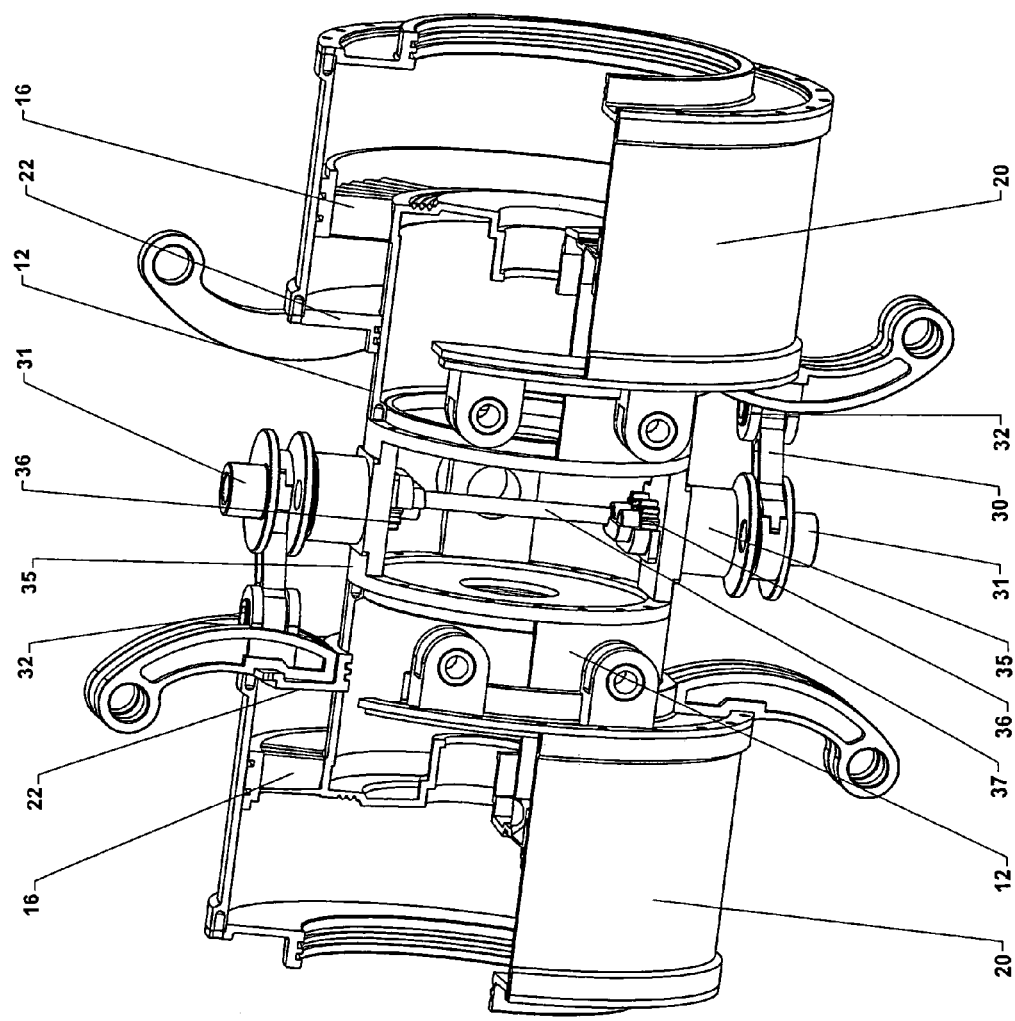
FIG. 6 is perspective view of the synchronizing mechanism of the engine of FIG. 1.

"As illustrated in FIG. 6 the synchronized movement of the pistons and the hydraulic cylinders is controlled by a synchronizing mechanism 35 that includes two cranks 31 mounted on the hollow dram that joins guide devices 12."A pair of the meshed gears 36 is attached to each crank 31 which are interconnected by intermediate shaft 37. This assures that the hydraulic cylinders 19 move toward and away from each other in a synchronized fashion, thereby maintaining the correct work sequence of the engine cylinders.

In operation, the expansion stroke of piston pairs 6a and 6b, and 6c and 6d causes the hydraulic cylinder assemblies 19 to move inwardly toward each other, while simultaneously forcing the compression stroke of piston pairs 6e and 6h, and 6f and 6g. Similarly, the expansion stroke of piston pairs 6e and 6h, and 6f and 6g causes the hydraulic cylinder assemblies 19 to move outwardly away from each other, while simultaneously forcing the compression stroke of piston pairs 6a and 6b, and 6c and 6d. Since piston pairs 6e and 6h, and 6f and 6g are moving in a direction that is perpendicular to the direction of movement of the hydraulic cylinders 19, linking rods 27 are employed to change the direction of the force generated by the moving pistons 6e and 6h, and 6f and 6g.

Figure 5:
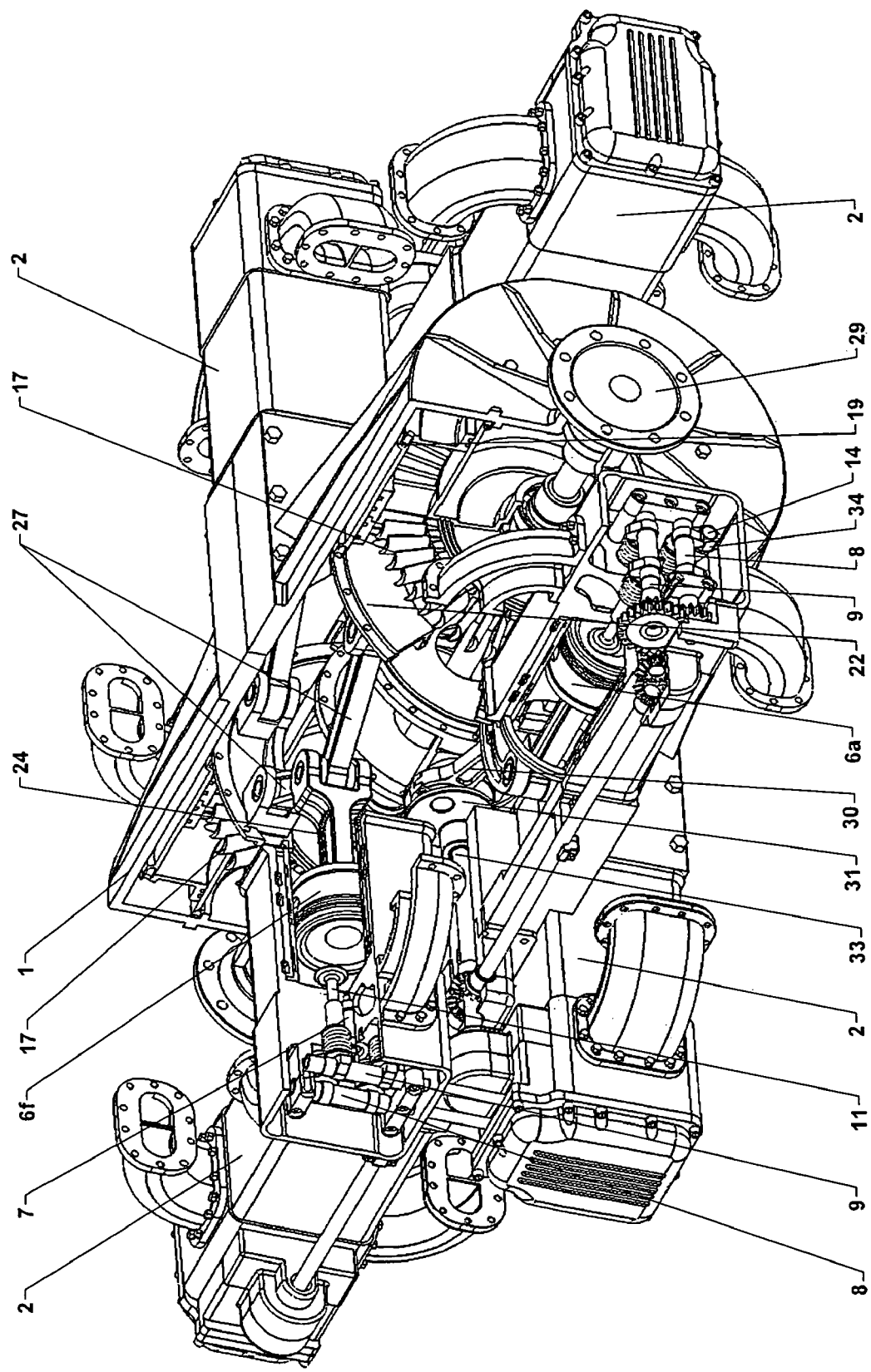
FIG. 5 is a perspective view of the engine of FIG. 1 showing the valve drive mechanism.

As illustrated in FIG. 5, the externally mounted mechanical timing assembly includes camshafts 8 and 9 that are driven by a crank mechanism, which is actuated by the reciprocating movement of the hydraulic cylinders 19. The crank mechanism includes connecting rod 30 that at one end is mounted on the crank 31 and connected at the opposite end to support 22 of the hydraulic cylinder 19 by pivot 32. Shaft 33 extends outwardly beyond the crank 31 and drives the camshafts as part of a routine gear train. It will be understood that optional timing mechanisms such as, but not limited to, an internally mounted assembly are within the scope of the present invention.

The considerable variability in the ratio between the stall speed torque and full speed torque of the impulse turbine gives a sufficiently wide range of operationally effective revolutions per minute to make the use of gear changing transmission unnecessary. However, the use of a gear changing transmission with the engine of the present invention is within the scope of the present invention.

It will be appreciated by one of ordinary skill in the art that the engine of the present invention may be readily adapted for use with any of the fuels now available on the market such as, but not limited to, gasoline, diesel fuel. The fuel may be naturally aspirated or injected into a manifold, or injected directly into the cylinder by use of a fuel injection system, and the engine may include a turbocharger or supercharger. Further, the engine of the present invention may be configured in either two or four stroke versions. It should be noted that the addition of a turbo-compressor associated with the output shaft so as to boost output power is within the scope of the present invention.

It will be appreciated that the above descriptions are intended only to serve as examples and that many other embodiments are possible within the spirit and the scope of the present invention.

What is claimed is:

1. An internal combustion engine comprising:
    a) at least one hydraulic cylinder assembly containing therein a working liquid, said at least one hydraulic cylinder assembly configured so as to be displaceable in a substantially reciprocating movement;
    b) at least one impulse turbine deployed within said hydraulic cylinder assembly, said at least one impulse turbine mechanically linked to a rotatable output shaft, said at least one impulse turbine configured such that movement of said working liquid onto said at least one impulse turbine during said reciprocating movement of said hydraulic cylinder assembly effects axial rotation of said at least one impulse turbine;
    c) at least a first and second pistons mechanically linked to said hydraulic cylinder assembly; and
    d) at least a first and second cylinders configured to slidingly receive said at least a first and second pistons such that movement of each of said pistons is effected within said first and second cylinders by combustion of fuel in combustion chambers defined by said at least a first and second pistons and said at least a first and second cylinders;

wherein movement of said pistons affects said reciprocating movement of said at least one hydraulic cylinder assembly and said hydraulic cylinder assembly is slidebly received on hydraulic cylinder guides.

2. The engine of claim 1, wherein said hydraulic cylinder guide includes at least two bladed guide devices formed by stationary guide buckets attached to said cylinder guides and facing said at least one impulse turbine in an opposing and concentric orientation, such that said working liquid is forced through said bladed guide devices and against said at least one impulse turbine.

3. The engine of claim 2, wherein said at least one impulse turbine is positioned between said at least two guide devices.

4. The engine of claim 3, wherein said hydraulic cylinder assembly and said hydraulic cylinder guides define a substantially annular space permanently filled with working liquid.

5. The engine of claim 4, wherein said at least one impulse turbine is mounted on said hydraulic cylinder guides.

6. The engine of claim 1, wherein said hydraulic cylinder assembly is deployed in a rigid case.

7. The engine of claim 6, wherein said cylinder guides are attached to said rigid case.

8. The engine of claim 6, wherein each of said at least a first and second pistons are deployed in an engine block assembly, each said engine block assembly being modularly attached to said rigid case.

9. The engine of claim 8, wherein each said engine block assembly houses one said cylinder configured to slidingly receive one said piston.

10. The engine of claim 8, wherein each said engine block assembly includes inlet and outlet valves, said inlet and outlet valves being actuated by an externally mounted mechanical timing assembly.

11. The engine of claim 10, wherein said mechanical timing assembly includes a crank mechanism activated by said reciprocating movement of said at least one hydraulic cylinder assembly.

12. The engine of claim 11, wherein said timing assembly provides said two hydraulic cylinder assemblies running synchronously.

13. An internal combustion engine comprising:
   a) at least one hydraulic cylinder assembly containing therein a working liquid, said at least one hydraulic cylinder assembly configured so as to be displaceable in a substantially reciprocating movement;
   b) at least one impulse turbine deployed within said hydraulic cylinder assembly, said at least one impulse turbine mechanically linked to a rotatable output shaft, said at least one impulse turbine configured such that movement of said working liquid onto said at least one impulse turbine during said reciprocating movement of said hydraulic cylinder assembly effects axial rotation of said at least one impulse turbine;
   c) at least a first and second pistons mechanically linked to said hydraulic cylinder assembly; and
   d) at least a first and second cylinders configured to slidingly receive said at least a first and second pistons such that movement of each of said pistons is effected within said first and second cylinders by combustion of fuel in combustion chambers defined by said at least a first and second pistons and said at least a first and second cylinders;
wherein movement of said pistons affects said reciprocating movement of said at least one hydraulic cylinder assembly wherein said at least a first piston is configured with a direction of stroke extending substantially parallel to an axis of said at least one impulse turbine, and said at least a second piston is configured with a direction of stroke extending substantially perpendicular to said axis of said at least one impulse turbine.

14. The engine of claim 13, wherein said at least a first piston is mechanically linked to said hydraulic cylinder assembly using connecting rods attached to a bracket substantially rigidly affixed to said hydraulic cylinder assembly and said at least a second piston is mechanically linked to said hydraulic cylinder assembly using connecting rods attached to at least one rotatable linking rod that is in turn rotatably attached to a support substantially rigidly affixed to said hydraulic cylinder assembly.

15. The engine of claim 13, wherein as one of said at least a first and said at least a second pistons is experiencing an expansion stroke another of said at least a first and said at least a second pistons is experiencing a compression stroke, such that force of said expansion stroke of one of said at least a first and said at least a second pistons provides force for said compression stroke of another of said at least a first and said at least a second pistons.

16. The engine of claim 15, wherein an inclination of said connecting rods is substantially unchanged throughout a course of said compression and said expansion strokes, therefore substantially no lateral forces are applied to wall of said cylinders by said pistons.

17. The engine of claim 15, wherein an expansion stroke of one of said at least a first and said at least a second pistons causes movement in a first direction of said reciprocating movement of said at least one hydraulic cylinder assembly and an expansion stroke of another of said at least a first and said at least a second pistons causes movement in a second direction of said reciprocating movement of said at least one hydraulic cylinder assembly.

18. The engine of claim 17, wherein said at least a first piston is implemented as a plurality of said first pistons configured with said direction of stroke extending substantially parallel to an axis of said at least one impulse turbine, and said at least a second piston is implemented as a plurality of said second pistons configured with said direction of stroke extending substantially perpendicular to said axis of said at least one impulse turbine.

19. The engine of claim 18, wherein a substantially similar working process occurs substantially simultaneously in each one of the engine block assemblies housing opposing pistons.

20. The engine of claim 18, wherein said at least one hydraulic cylinder assembly and said at least one impulse turbine are implemented as a first and second said hydraulic cylinder assemblies and a first and second impulse turbines, such that one of said first and second impulse turbines is deployed in each of said first and second hydraulic cylinder assemblies.

21. The engine of claim 20, wherein a first half of said plurality of said first pistons is mechanically linked to said first hydraulic cylinder assembly, a second half of said plurality of said first pistons is mechanically linked to said second hydraulic cylinder assembly, a first half of said plurality of said second pistons is mechanically linked to said first hydraulic cylinder assembly, and a second half of said plurality of said second pistons is mechanically linked to said second hydraulic cylinder assembly.

* * * * *

UNITED STATES PATENT AND TRADEMARK OFFICE
CERTIFICATE OF CORRECTION

| | | |
|---|---|---|
| PATENT NO. | : 7,100,546 B2 | Page 1 of 1 |
| APPLICATION NO. | : 10/944837 | |
| DATED | : September 5, 2006 | |
| INVENTOR(S) | : Mark Sorochkin et al. | |

It is certified that error appears in the above-identified patent and that said Letters Patent is hereby corrected as shown below:

On the Title Page, Item (76) Inventor

"Alexey Sorochkin, Yonge Street 3600, AP, 531, Toronto (CA)" should be removed as an inventor of the above-mentioned issued patent.

Signed and Sealed this

Twenty-third Day of September, 2008

JON W. DUDAS
*Director of the United States Patent and Trademark Office*